C. H. PATTEN.
FLUID DIFFERENTIAL.
APPLICATION FILED NOV. 20, 1919.
1,374,603.
Patented Apr. 12, 1921.
2 SHEETS—SHEET 2.
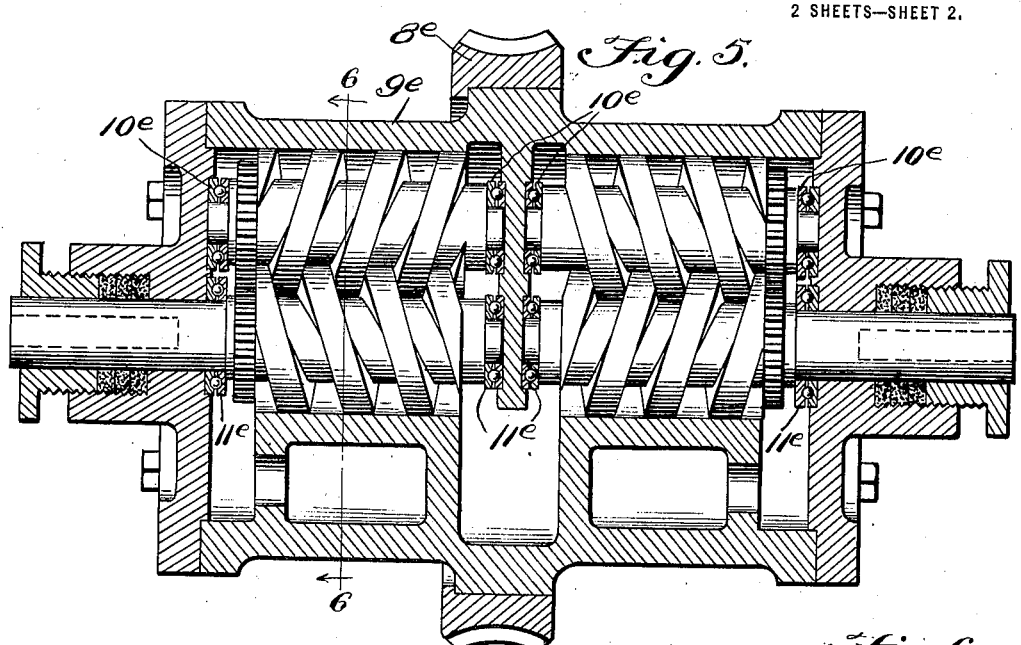
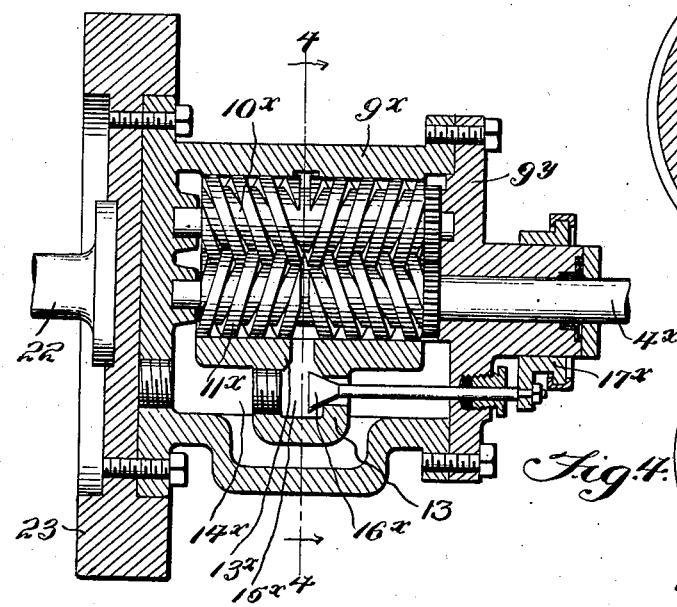
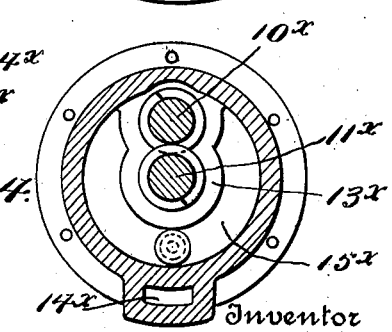
Inventor
Charles H. Patten
By Shean Middleton Donaldson & Hall
Attorney

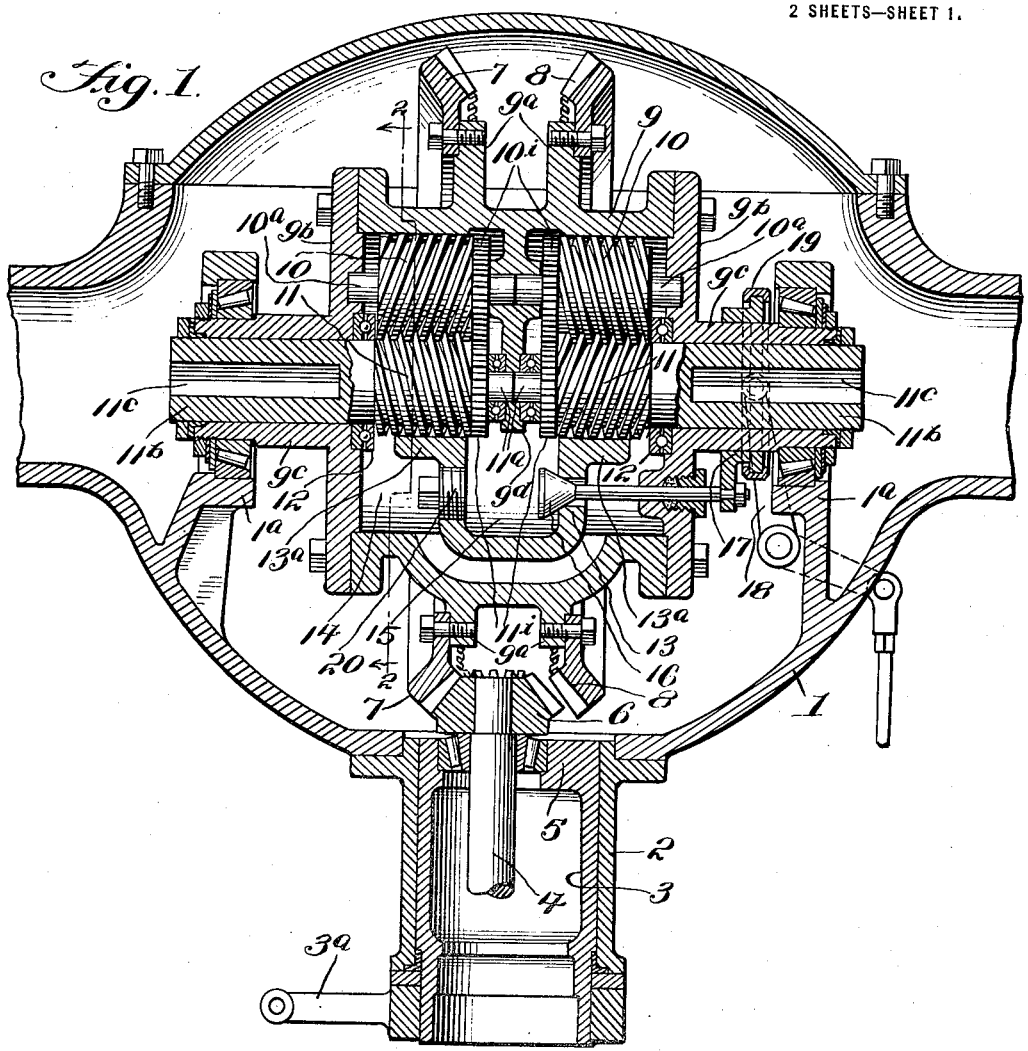

UNITED STATES PATENT OFFICE.

CHARLES H. PATTEN, OF ALLENTOWN, PENNSYLVANIA.

FLUID-DIFFERENTIAL.

1,374,603.   Specification of Letters Patent.   Patented Apr. 12, 1921.

Application filed November 20, 1919. Serial No. 339,333.

*To all whom it may concern:*

Be it known that I, CHARLES H. PATTEN, a citizen of the United States, resident of Allentown, Pennsylvania, have invented certain new and useful Improvements in Fluid-Differential, of which the following is a specification.

My present invention relates to fluid operated power transmitting mechanism and aims to provide a simple, economical, durable and efficient construction which will be highly flexible and will avoid all danger of stripping of gears.

My improved construction is especially adapted for embodiment in the differential of a motor vehicle in which it provides means for changing the speed from zero through all degrees up to a maximum, thus dispensing with the necessity of the ordinary change speed gearing, enables the driving wheels to have the necessary differential action in rounding curves, and makes the differential self locking, *i. e.*, if one wheel looses its traction power will still be applied to the other.

Other objects and advantages will be clear from the following specification.

My invention includes the novel features of construction and arrangement and combination of parts hereinafter described and defined by the appended claims.

An embodiment of my invention is illustrated in the accompanying drawings, in which:—

Figure 1 is a horizontal sectional view through a differential embodying my invention.

Fig. 2 is a transverse sectional detail.

Fig. 3 is a longitudinal section of a modification, and,

Fig. 4 a transverse section of the same.

Fig. 5 is a longitudinal sectional view, and,

Fig. 6 a transverse section of a modified form of differential.

Referring by reference characters to these drawings, the numeral 1 designates the differential housing carrying at its forward side a stationary bearing sleeve 2 within which is mounted a rotatable sleeve 3. The rear end of the propeller shaft is indicated at 4 which is designed to be connected to the engine through two universal couplings, which, as they are well known, and form no part of the present invention, are not illustrated herein. Rotatable sleeve 3 has an eccentric bearing ring 5 in which the propeller shaft is journaled, and the propeller shaft has fast on its rear end a bevel pinion 6 designed to mesh with one or the other of corresponding bevel gears 7 and 8 fast on the body 9 of the differential. Means are provided for rotating the sleeve 3, such for example as an arm 3ª which may be connected to any suitable operating device within convenient reach of the driver, and it will be seen that with the sleeve in one position, as shown for example in Fig. 1, pinion 6 will mesh with gear 7 and the body of the differential will be rotated in a direction to drive the machine forward. Rotation of the sleeve 3 through an angle of 180 degrees will shift shaft 4 and pinion 6 laterally until it engages gear 8 for driving the differential body in a reverse direction, while a position of the sleeve between these two points will hold the pinion 6 out of mesh with both gears 7 and 8.

The differential body preferably comprises a substantially cylindrical member 9 having peripheral flanges 9ª to which the gears 7 and 8 may be connected in any suitable manner, and end caps 9ᵇ provided with cylindrical bosses or extensions 9ᶜ which are journaled in anti-friction bearings of any approved construction, in the split supporting parts, or brackets, 1ª, of the differential housing.

Within the body of the differential are located a pair of fluid pumps which are preferably of the screw type; each pair comprising a screw member 10 having end bosses 10ª rotatably mounted in the end caps 9ᵇ and a central supporting bracket 9ᵈ, and a screw member 11 having its inner end provided with a boss 11ª journaled in the bracket 9ᵇ and its outer portion formed cylindrical as at 11ᵇ and passed through the axial opening in the bearing portion or hub 9ᶜ. Each pair of screw members 10 and 11 are connected to rotate in unison by intermeshing gears 10ⁱ and 11ⁱ whereby wedging of the screw pump members is prevented. Thrust bearings may be provided as indicated at 12. These cylindrical portions 11ᵇ are provided with non-circular openings 11ᶜ to receive the ends of the axles (not shown) which may be either of the full floating or semi-floating type.

A partition 13, which is provided with cylindrical portions 13ª fitting the pump screws, divides the interior of the differential body or casing into two chambers, a suction chamber 14, and a compression chamber 15. These chambers are designed to be filled with a suitable fluid such as oil, and a passage is provided through the partition wall 13 which is controlled by a valve 16 having its stem passed through a suitably packed opening in end cap 9$^b$ and operated by any suitable means. As shown in the drawings, this takes the form of a slidable collar 17, to which the valve stem is connected, which is operated by a lever 18 through a slip ring 19, the lever being designed to be operated by suitable connections from the driver's seat.

An opening is preferably made in the wall opposite the valve which is closed by a removable plug 20.

From the foregoing description it is believed the operation of my improved differential will be clear but it may be briefly stated as follows:—

Supposing the pinion 6 to be in mesh with gear 7 as shown the differential body 9 will be rotated in a direction to drive the machine forward.

The wheel axles and screw members 11 will of course tend to remain stationary causing screw members 10 to roll around the same with a planetary action. The screws will therefore act as pumps withdrawing liquid from the suction chamber and forcing it into the compression chamber. If the valve is closed the differential will be quickly locked and the driving wheel axles will therefore be rotated at the same speed as the gear 7, less a small percentage for slippage in the screw pumps.

The ratio of speed may, however, be regulated by opening the valve, and when the valve is fully open no motion will be imparted to the driving wheels.

When pinion 6 is thrown in mesh with gear 8 the reverse operation takes place.

My invention is capable with equal advantage of being incorporated as a transmission element between the engine shaft and the propeller shaft, as illustrated in Figs. 3 and 4.

Referring to this embodiment 22 designates the engine shaft carrying the fly wheel 23 to which is secured in any suitable manner the rotatable fluid casing 9, having the removable end plate 9$^y$. This casing is provided with an interior partition 13, having the intersecting cylindrical portions to receive the screw pump members 10$^x$ and 11$^x$, the partition forming the separate compartments 14$^x$ and 15$^x$, the screw pumps being adapted to force the fluid from one chamber to the other in the same manner as described in connection with Fig. 1. The screw member 11$^x$ is connected in any suitable manner with the propeller shaft 4$^x$ which is axially in line therewith and a by-pass is formed connecting the two chambers which is controlled by a valve 16$^x$ operated by the shafting collar 17$^x$ controlled in any suitable manner.

In Figs. 5 and 6 I have shown my invention embodied in a plain differential in which the casing 9$^e$ is designed to be driven from the propeller shaft (not shown) by any suitable position gearing as for instance, the worm wheel 8$^e$ which would be engaged by a worm on the propeller shaft.

In this form I have shown how all the members of the screw pumps may be journaled in anti-friction bearings as indicated at 10$^e$ and 11$^e$.

The other parts, being substantially the same, no further specific description is deemed necessary.

Having thus described my invention what I claim is:

1. In a device for transmitting motion, a fluid-tight casing or body mounted for rotation having two fluid chambers therein, a pair of intermeshing screw pump members carried within said body and adapted to pump liquid from one chamber to the other, one of said members being coaxial with said casing and the other arranged off center.

2. In combination, a rotatable casing adapted to contain fluid and having two fluid chambers, means for rotating said casing, two pairs of screw pump members rotatably mounted in said casing and adapted to simultaneously pump fluid from one chamber to the other, one screw member of each pair being coaxial with the casing, and means projecting through opposite ends of the casing for connecting a shaft to be driven to each coaxial member.

3. In a combination, a rotatable fluid casing having two fluid chambers, two pairs of screw pump members rotatably mounted in said casing and adapted to pump fluid from one chamber to the other, one member of each pair being disposed axially of the casing and provided with shaft engaging means, and the other member being arranged off center, and a valve controlled by-pass between said chambers.

4. In combination, a rotatable fluid casing, a substantially U-shaped partition therein dividing said casing into an inner and an outer chamber, the side walls of said partition having alined cylindrical portions, two pairs of intermeshing screw members rotatably mounted in said cylindrical portions, one member of each pair projecting through an opening in the corresponding end wall of the casing, said members having shaft engaging means, and a valve controlled by-pass in said partition.

5. In combination, a rotatable fluid casing having end walls provided with axial alined cylindrical hubs, bearings in which said hubs are journaled, a substantially U-shaped partition dividing said casing into inner and outer chambers, the side walls of said partition having two sets of intersecting cylindrical passages, a set of screw members located in one set of cylindrical passages and having cylindric portions projecting through the hubs, a second set of screw members located in the other set of passages and meshing with said first named screw members, and a valve controlled by-pass in said partition.

6. In combination, a main housing having bearing brackets, a rotatable casing having end walls provided with tubular hubs journaled in said brackets, a substantially U-shaped partition within said casing dividing the interior of the casing into two chambers, the side walls of said partition having each a pair of intersecting pump cylinders, a pair of intermeshing screw pump members rotatably mounted in each pair of cylinders, one screw member of each pair having a cylindric portion projecting through the corresponding tubular hub, a valve controlled by-pass in said partition, and means for rotating said casing.

7. In combination, a main housing having bearing brackets, a rotatable casing having end walls provided with tubular hubs journaled in said brackets, a substantially U-shaped partition within said casing dividing the interior of the casing into two chambers, the side walls of said partition having each a pair of intersecting pump cylinders, a pair of intermeshing screw pump members rotatably mounted in each pair of cylinders, one screw member of each pair having a cylindric portion projecting through the corresponding tubular hub, a valve controlled by-pass in said partition, an annular gear on said casing, and a propeller shaft rotatably mounted relative to said housing and having a pinion meshing with said gear.

8. In combination, a main housing having bearing brackets, a rotatable casing having end walls provided with tubular hubs journaled in said brackets, a substantially U-shaped partition within said casing dividing the interior of the casing into two chambers, the side walls of said partition having each a pair of intersecting pump cylinders, a pair of intermeshing screw pump members rotatively mounted in each pair of cylinders, one screw member of each pair having a cylindric portion projecting through the corresponding tubular hub, a valve controlled by-pass in said partition, a pair of annular opposed gear rings on said casing, and a propeller shaft rotatably mounted relative to said housing, said propeller shaft having a pinion adapted to mesh with either of said gear rings, and means for shifting said propeller shaft laterally to bring the pinion into mesh with either gear.

9. In combination, a main housing having bearing brackets, a rotatable casing having end walls provided with tubular hubs journaled in said brackets, a substantially U-shaped partition within said casing dividing the interior of the casing into two chambers, the side walls of said partition having each a pair of intersecting pump cylinders, a pair of intermeshing screw pump members rotatably mounted in each pair of cylinders, one screw member of each pair having a cylindric portion projecting through the corresponding tubular hub, a valve controlled by-pass in said partition, a pair of annular opposed gear rings on said casing, and a propeller shaft rotatably mounted relative to said housing, said propeller shaft having a pinion adapted to mesh with either of said gear rings, and means for shifting said propeller shaft laterally to bring the pinion into mesh with either gear, said means comprising a sleeve rotatably mounted relative to said housing, said sleeve having an eccentric bearing in which said propeller shaft is journaled.

10. In a fluid transmission, a rotatable casing with means for rotating it, said casing having a pair of separate chambers, a pair of rotatable intermeshing screw pump members for pumping fluid from one chamber to the other, one of said screw members having a part projecting axially through the casing and provided with shaft connecting means.

In testimony whereof I affix my signature.

CHARLES H. PATTEN.